(12) United States Patent
Hosain et al.

(10) Patent No.: US 7,092,696 B1
(45) Date of Patent: Aug. 15, 2006

(54) ACCOUNTING METHOD AND APPARATUS FOR COMMUNICATIONS NETWORK

(75) Inventors: Akram M. Hosain, Richardson, TX (US); Emad Qaddoura, Plano, TX (US); Mary Barnes, Flower Mound, TX (US); Haseeb Akhtar, Garland, TX (US)

(73) Assignee: Nortel Networks Limited, St. Laurent (CA)

( * ) Notice: Subject to any disclaimer, the term of this patent is extended or adjusted under 35 U.S.C. 154(b) by 796 days.

(21) Appl. No.: 09/412,099

(22) Filed: Oct. 4, 1999

Related U.S. Application Data

(60) Provisional application No. 60/127,406, filed on Apr. 1, 1999, provisional application No. 60/104,107, filed on Oct. 13, 1998.

(51) Int. Cl.
- H04M 11/00 (2006.01)
- H04Q 7/20 (2006.01)
- G06F 15/16 (2006.01)

(52) U.S. Cl. .................. 455/405; 455/406; 455/422; 455/432; 709/201; 709/224; 709/217

(58) Field of Classification Search ............... 455/405, 455/406, 422, 432
See application file for complete search history.

(56) References Cited

U.S. PATENT DOCUMENTS

| | | | |
|---|---|---|---|
| 5,740,361 A | 4/1998 | Brown | |
| 5,751,708 A | 5/1998 | Eng et al. | |
| 5,793,762 A | 8/1998 | Penners et al. | |
| 6,347,079 B1 * | 2/2002 | Stephens et al. | 370/255 |
| 6,377,982 B1 * | 4/2002 | Rai et al. | 709/217 |
| 6,560,442 B1 * | 5/2003 | Yost et al. | 455/423 |

FOREIGN PATENT DOCUMENTS

| WO | WO 97/23100 | 6/1997 |
|---|---|---|

OTHER PUBLICATIONS

Charles E. Perkins, *Mobile Networking Through Mobile IP*, 1-18 printed from web site http://www.computer.org, dated in 1997.

Pat R. Calhoun, et al., *Diameter Mobile IP Extensions*, Internet Draft, 1-37 (Sep. 13, 1999).

Dr. Matthew Lucas, *The IP Detail Record Initiative*, Billing World, 30 and 32 (Jul./Aug. 1999).

IPDR.ORG, *IPDR-Industry Initiative Formed to Develop Critical New IP Standard*, 1-2, printed from web site http://www.ipdr.org (Jul. 28, 1999).

(Continued)

*Primary Examiner*—Doris H. To
*Assistant Examiner*—Yuwen Pan
(74) *Attorney, Agent, or Firm*—Trop, Pruner & Hu, P.C.

(57) ABSTRACT

An accounting framework is provided for a communications system having a plurality of service providers, including cellular service providers and/or data network service providers, e.g., Internet service providers. Accounting units containing accounting information are exchanged between service providers to allow the service providers to charge for usage of services. The accounting units have a predetermined format to allow them to be exchanged between different service providers. Each accounting unit includes a plurality of fields, including a service type field, a usage of radio interface field, a usage of a visited or external network field, a usage of mobility management field, a quality of service field, a usage of a packet data protocol field, and other fields. Users may be charged for services based on these fields.

30 Claims, 9 Drawing Sheets

OTHER PUBLICATIONS

Ted Smalley Bowen, *Standard Sought for Billing of IP Services*, 1-2, printed from web site http://www.infoworld.com (Aug. 6, 1999).

Hanna Hurley, *A New Brew For IP Detail Records*, Telephony—Intelligence & Software, 1-3, printed from web site http://www.internettelephony.com (Aug. 16, 1999).

IPDR.ORG, *The IPDR Initiative*, 1, printed from web site http://www.ipdr.org, dated in 1999.

*GPRS System Architecture*, 1-11, printed from web site http://members.tripod.com, dated at least as early as Sep. 12, 1999.

GTE Wireless, *CDPD FAQ*, 1-2, printed from web site www.gte.com, dated at least as early as Sep. 12, 1999.

Surinder S. Anand, et al., *Accounting Architecture for Cellular Networks*, IEEE ICPWC'96 184-189, dated in 1996.

C. Perkins, *RFC 2002*, Network Working Group, 1-76, printed from web site http://sunsite.aud.dk/RFC/rfc/rfc2002.html (Oct. 1996).

J. Solomon, et al., *RFC 2290*, Network Working Group, 1-17, printed from web site http://sunsite.aud.dk/RFC/rfc/rfc2290.html (Feb. 1998).

Peter Rysavy, *General Packet Radio Service (GPRS)*, PCS Data Today Online Journal, 1-8, printed from web site http://www.pcsdata.com (Sep. 30, 1998).

*Accounting Service and Protocol*, CDPD System Specification, Release 1.1, 630-1 to 630-40 (Jan. 19, 1995).

The Applied Technologies Group, *Wireless Enterprise Networking*, The Technology Guide Series, 1-40 (1998).

Deborah Estrin and Lixia Zhang, *Design Considerations for Usage Accounting and Feedback in Internetworks*, 20 Computer Communication Review, 56-66 (Oct. 1990).

Giuseppe Bottura, *Charging and Tariffing Functions and Capabilities for Mans, Network Technologies Division*, 0208-0218 (Jan. 1992).

Dr. Gregory Ruth and Cyndi Mills, *Usage-Based Cost Recovery in Internetworks*, Business Communications Review, 38-42 (Jul. 1992).

Wei-lung Wang, *A Protocol for Billing Mobile Network Access Devices Operating in Foreign Networks*, 262-268 (Jun. 1998).

\* cited by examiner

TRAFFIC MATRIX SEGMENT DATA ROW CONTENTS

| | |
|---|---|
| | 304 |
| | 400 |
| CELL IDENTIFIERS | 401 |
| TRAFFIC TYPE | 402 |
| SERVING INFO | 403 |
| HOME INFO | 404 |
| EQUIPMENT IDENTIFIER | 405 |
| AUTHENTICATION SEQUENCE NUMBER | 406 |
| SOURCE DESTINATION FLAG | 407 |
| MIN | 408 |
| SESSION ID | 409 |
| SESSION DURATION | 410 |
| SUB USAGE DURATION | 78 |
| QUALITY OF SERVICE | 411 |
| CHARGING ID | 412 |
| PDP TYPE | 81 |
| NAI ADDRESS | 71 |
| SERVICE TYPES | 79 |
| SOURCE AND DESTINATION ADDRESS | 72 |
| USAGE OF AIR INTERFACE | 82 |
| USAGE OF PDP/TEP | 74 |
| USAGE MM | 73 |
| USAGE OF EXTERNAL DATA NETWORK | 75 |
| BILLABLE NUMBER | 76 |
| CHARGING ZONE | 83 |
| METERING CLASS | 77 |
| TERMINATION ERROR CODE | |
| | 80 |
| DATA PACKET COUNT | 415 |
| DATA OCTET COUNT | 416 |
| CONTROL PACKET COUNT | 418 |
| CONTROL OCTET COUNT | 419 |
| DISCARDED PACKET COUNT | |

FIG. 8

ACCOUNTING METHOD AND APPARATUS FOR COMMUNICATIONS NETWORK

This application claims priority under 35 U.S.C. § 119(e) to U.S. Provisional Patent Application Ser. No. 60/104,107, entitled "Mobile IP Integrated GPRS Accounting Framework," filed Oct. 13, 1998; and U.S. Provisional Patent Application Ser. No. 60/127,406, entitled "Merged Packet Service and Mobile Internet Protocol," filed Apr. 1, 1999.

BACKGROUND

The invention relates to accounting methods and apparatus for communications networks, such as cellular networks and data networks.

With increased availability of data networks, such as the Internet and intranets, nodes coupled to the data networks can more easily communicate with each other. Popular forms of communications across data networks include electronic mail, file transfer, web browsing, and other exchanges of data. With improved network bandwidth, higher quality voice and/or video communications have also become possible.

Although data networks offer access to a wide array of communications options and information sources, such access is typically not available until the user is sitting at a terminal that is coupled to the data network, such as a terminal located in the home, office, or vehicle. To address this, proposals have been made for providing mobile, cellular computers that can connect to the data networks while moving from place to place. One protocol that has been proposed is the Mobile Internet Protocol (MIP), as described in Request for Comments 2002, entitled "IP Mobility Support," dated October 1996, and proposed by a working group within the Internet Engineering Task Force (IETF).

As a mobile node moves from location to location, the points of attachments of the mobile node to a data network may change, which may require a new IP address to be associated with the new point of attachment. A point of attachment may be defined as any wireless link between the mobile node and the data network within a given area. A wireless point of attachment may also be provided by a packet-based cellular system, such as a cellular digital packet data (CDPD) system, a general packet radio service (GPRS) system, an enhanced GPRS (EGPRS) system, an EGPRS Compact system, or other packet-based cellular systems.

The Mobile IP protocol allows the mobile node to use either one of two IP addresses, which include a home address that may be assigned "permanently" to a mobile node and remains unchanged regardless of where the node is attached to the data network. The mobile node may also be assigned a care-of address that changes at each new point of attachment. The care-of address includes the visited network's identity number and thus identifies the mobile node's point of attachment. Whenever the mobile node moves, it registers its new care-of address with its home agent located in its home network. To get a packet to a mobile node from its home network, the home agent delivers the packet from the home network to the care-of address. The home agent is a router on a mobile node's home network that delivers packets to roaming mobile nodes and maintains the current location for each mobile node. In a foreign network, which is any network other then the mobile node's home network, a foreign agent, which is a router on a mobile node's visited network, cooperates with the home agent to complete delivery of packets to the mobile node while it is away from the home network. When a mobile node moves away from its home network, it obtains a care-of address on the foreign network by soliciting or listening for special messages (referred to as agent advertisements).

In a traditional cellular network, a mobile user is typically charged for utilizing wireless services provided by a service provider. Typically, a user subscribes to a home service provider, which may have agreements in place with other service providers to allow the wireless user to roam between networks provided by the several service providers. Various types of accounting and billing mechanisms have been implemented to charge users for usage of services as they move between networks provided by different service providers. For example, an accounting architecture is defined by the CDPD standard, described in the CDPD System Specification, Release 1.1, dated January 1995, from the CDPD Forum, Inc. The CDPD protocol provides access to a packet-based network by providing a packet-based overlay to existing voice cellular systems. CDPD detects gaps between voice communications on cellular channels and directs packets of data to those channels. A service provider bills a subscriber for usage based on several parameters, including data packet counts, source and destination addresses, geographical location of the mobile node, and time of transmission. A primary service provider may have to share revenue collected from a subscriber with other service providers whose networks the subscriber may have used during the billing period.

However, conventional systems such as CDPD systems do not bill specifically for usage of packet-based data networks, such as the Internet or intranets, for various services. Such services may include electronic mail, file transfer, electronic commerce, real-time services (such as voice communications over data networks and multimedia conferencing), and other data network services. Further, a general predetermined format for describing accounting information is not available for different service providers to conveniently exchange accounting information. A need thus exists for a method and apparatus that is capable of charging for services utilized on packet-based data networks and that utilizes a uniform format for accounting information.

SUMMARY

In general, according to one embodiment, a method of accounting for services provided over a packet-based network includes communicating units of accounting information carrying information regarding usage of the packet-based network. The unit of accounting information has a predetermined format capable of being exchanged between a plurality of entities. Values are assigned to entries in each unit of accounting information based on usage, the unit including a first entry indicating a type of service provided over the data network.

Some embodiments of the invention may offer one or more of the following advantages. By defining an accounting framework for charging services used on a packet-based network, service providers can bill subscribers for usage of packet-based networks. An accounting unit having a predetermined format that includes accounting information may be used to facilitate the exchange of accounting information between multiple service providers. Thus, accounting information collected by one service provider may be communicated to another service provider without complicated translations or conversions of accounting formats that may differ between service providers.

Other embodiments and advantages will become apparent from the following description, from the drawings, and from the claims.

BRIEF DESCRIPTION OF THE DRAWINGS

FIG. 8 illustrates row contents of the traffic matrix segment of FIG. 6.

DETAILED DESCRIPTION

In the following description, numerous details are set forth to provide an understanding of the present invention. However, it will be understood by those skilled in the art that the present invention may be practiced without these details and that numerous variations or modifications from the described embodiments may be possible.

Figure 1:
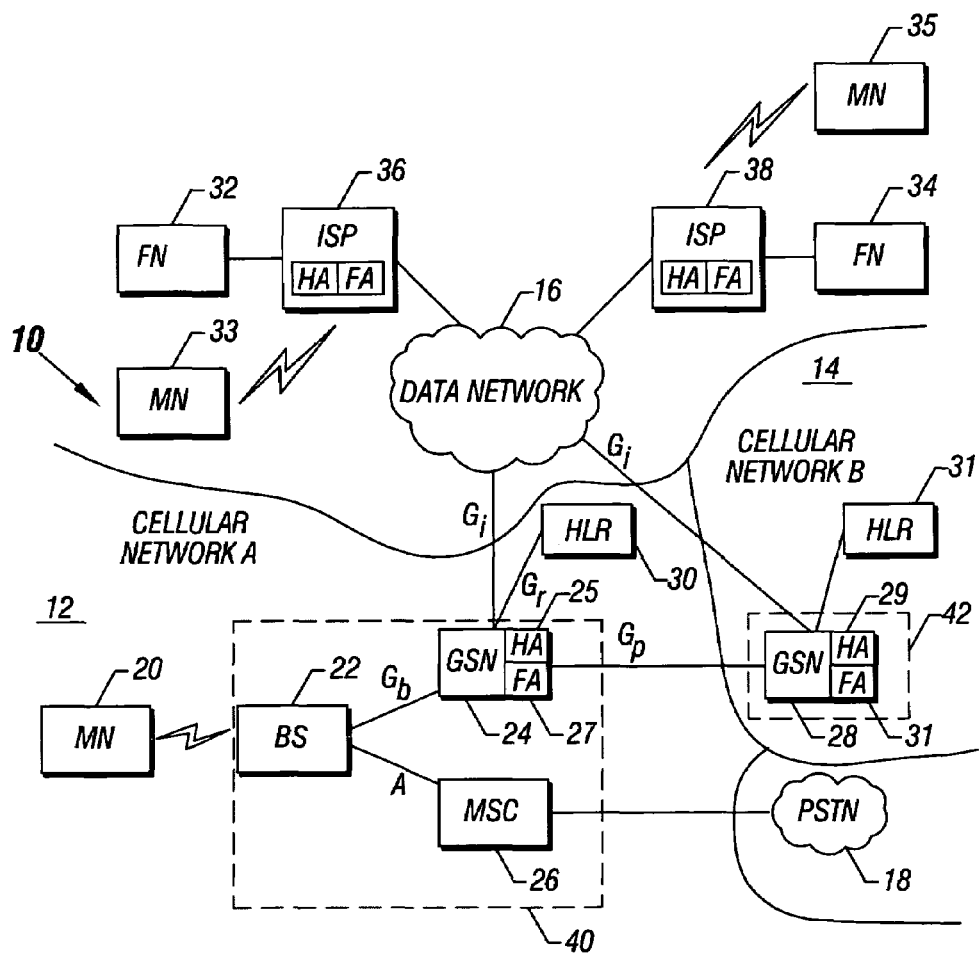
FIG. 1 is a block diagram of an embodiment of a communications system including cellular networks and data networks.

Referring to FIG. 1, a communications system 10 includes various networks, including cellular networks 12 and 14 and a data network 16, which may include the Internet and various intranets, as examples. As used here, "a network" or "the network" may refer to one or more networks, communications channels, links, or paths. The data network 16 is a packet-based network over which various forms of data communications may occur. A packet-based network is a network over which communications of information is performed by sending and receiving packets, datagrams, or messages. This is contrasted with circuited switched networks, such as voice networks provided by telephone providers and cellular providers. In a circuit-switched network, a line (or combination of lines) is occupied for the duration of the communications session.

Fixed nodes (non-mobile nodes) 32 and 34 may be coupled through service providers 36 and 38, respectively, to the data network 16. To obtain access to the Internet, users of fixed nodes 32 and 34 may subscribe with the service providers 36 and 38. Example communications between nodes coupled through the data network 16 may include electronic mail, file transfer, web browsing, chat sessions, real-time services such as audio and video conferencing, electronic commerce, multicast of multimedia data, and so forth. A real-time service may include any communications session in which some form of interactive exchange is occurring between two endpoints. Audio and video conferencing over a packet-based network involves the transmission and receipt of voice and video data in packets.

Conventionally, an accounting mechanism has not been developed for the different types of services available over the data network 16. A subscriber may pay a service provider a flat fee and in some cases fees based on time used for access to the data network 16. However, actual usage of different types of services generally have not been billed by service providers. Further, a general format for accounting information has not been defined that can be easily exchanged between service providers. In accordance with some embodiments, an accounting framework is provided for the various types of services offered by service providers over the data network 16 in which usage of services over the data network 16 is accounted for and which defines accounting units of predetermined formats that form the basic units for the exchange of accounting information. A uniform or common format is defined for the accounting units which may be employed by multiple entities, such as the service providers, to exchange accounting information.

As used here, "accounting" is used in its broad sense to refer to the collection, recordation, or communication of information from which an entity such as a service provider can determine charges to bill a subscriber or customer. "Accounting" may also refer to the billing or charging of subscribers or users of services. An "accounting framework" refers to the method and system employed to implement the accounting.

In addition to fixed nodes 32 and 34, mobile nodes 33 and 35 may also be coupled to the data network 16 through respective service providers 36 and 38 by some underlying wireless mechanism. To manage mobility of the mobile nodes 33 and 35, a version of Mobile Internet Protocol (MIP) may be employed in one embodiment. A version of MIP is described in Request for Comments (RFC) 2002, entitled "IP Mobility Support," dated October 1996. In accordance with some embodiments, the data network 16 may employ IP (Internet Protocol) to route data packets between a source endpoint and a destination endpoint, with the endpoints being fixed nodes (such as nodes 32 and 34) or mobile nodes (such as nodes 33 and 35). An IP address typically carries with it information that specifies the IP node's point of attachment. In an IP network, packets are routed from a source endpoint to a destination endpoint based on the destination IP address. However, as a mobile node travels between different networks, its point of attachment changes. Using MIP, mobility is made possible by assigning two addresses to the mobile node: a home address that is static, and a care-of address that changes at each new point of attachment. The home address makes it appear that the mobile node is continually able to receive data on its home network. However, when the mobile node moves to another network, it is attached to a visited or foreign network.

The home network includes a home agent (HA), which is a router that delivers packets to departed mobile nodes and maintains current location information for each mobile node. Each network also includes a foreign agent (FA), which is a router on a visited or foreign network that cooperates with the home agent to complete the delivery of packets when a mobile node is away from its home network. Packets that are sent to the mobile node's home address are intercepted by its home agent, tunneled (sent after predetermined encapsulation) by its home agent to the care-of address, received at the tunnel endpoint (either at a foreign agent or at the mobile node itself), and finally delivered to the mobile node. In an example arrangement, the home network for the mobile node 33 may be provided by one of the service providers 36 and 38 and the foreign network provided by the other one of the service providers.

In addition to networks provided by the service providers 36 and 38, cellular networks 12 and 14 may also be part of the communications system 10. The cellular networks offer both circuit-switched services and packet-switched services offered by a packet-switched system that is an overlay of the circuit-switched system. The first cellular network 12 is controlled by a mobile switching center (MSC) 26 for circuit-switched (voice, short messaging, and other types of circuit-switched services) communications. The MSC 26 controls communications between mobile nodes as well as between a mobile node and a wireline unit coupled through a public switched telephone network (PSTN) 18. The MSC 26 is coupled to a base station 22 over a link, referred to as an A link. The base station 22 includes antennas to transmit and receive control and traffic signaling to and from a mobile node 20.

To provide access for a mobile node in the cellular network 12 to the packet-switched data network 16, a service node 24 is provided between the base station 22 and the data network 16. In accordance with one embodiment, the service node may be a general packet radio service (GPRS) service node, referred to herein as GSN. GPRS provides a high-speed packet data technology to provide wireless data services. GPRS is designed to complement GSM (Global System for Mobile) circuit-switched networks. More recently, third generation protocols for packet-switched communications over wireless networks have also been proposed, such as EGPRS (enhanced GPRS) and EGPRS Compact. Such packet-based cellular systems may also be employed in further embodiments.

As shown in FIG. 1, the link between the GSN 24 and the base station 22 is referred to as a $G_b$ link, while the link between the GSN 24 and the data network 16 is referred to as a $G_i$ link. The GSN 24 can also be coupled to GSNs in other cellular networks, such as a GSN 28 in the cellular network 14. The link between two GSNs is referred to as a $G_p$ link. The types of packet-switched protocols that GPRS may support include IP and the X.25 Protocol. IP is described in RFC 791, entitled "Internet Protocol," dated September 1981. X.25 is a protocol developed by the International Consultative Committee on Telephony and Telegraphy (CCITT).

In one example arrangement, the cellular network 12 may be provided by a service provider 40 and the cellular network 14 may be provided by a service provider 42. A mobile node may roam among the cellular networks 12 and 14 as well as between a cellular network and a network provided by one of the service providers 36 and 38. To provide continual access to the data network 16 as the mobile node moves from a cellular network (12 or 14) to a network provided by one of service providers 36 and 38, home agents (25 and 29) and foreign agents (27 and 31) are defined in the networks 12 and 14 to provide mobility management according to MIP. During roaming of the various networks, a mobile node can continue to access the various types of services offered over the data network 16. Thus, according to MIP, a mobile node may be forwarded packets to its care-of address as it moves within the networks provided by service providers 36 and 38, the cellular networks 12 and 14, and therebetween. In accordance with some embodiments, an accounting framework provides a mechanism to account for usage of services in the data network 16 by either fixed nodes or mobile nodes.

Each GSN 24 or 28 is also coupled to a home location register (HLR) 30 or 31, respectively, which contains a database of subscriber information used to provide control in cellular networks. The HLR is manage by the cellular service provider and represents the home database for subscribers who have subscribed to a service with the cellular service provider. The HLR contains a record for each home subscriber that includes location information, subscriber status, subscribed features and directory numbers. The link between an HLR and a GSN is referred to as a $G_r$ link.

In accordance with some embodiments, usage of the wireless connection services offered by the various service providers (36, 38, 40, 42) as well as services over the data network 16 are subject to accounting. According to one embodiment of an accounting framework, various entities are involved, including a primary service provider, a home service provider, a serving service provider, and a consolidation service provider. Separation of the roles of the primary and home service providers allows a business entity to offer services to subscribers without having to operate a network. Thus, the primary service provider does not necessarily operate a service provider network, but is capable of activating subscribers on either a cellular access provider, such as a provider for the cellular network 12 or 14, or on an Internet service provider, such as service providers 36 and 38. In effect, a primary service provider provides the accounting home for a subscriber. A home service provider provides the routing home for a subscriber. A serving service provider operates a serving network to serve a mobile node when it visits the serving network. A consolidation service provider provides consolidation services to customers requiring consolidated billing for a group of subscribers. It is contemplated, however, that the home service provider, primary service provider, and consolidation service provider may be part of the same entity. Further, the primary service provider and consolidation service provider may collectively be referred to as a customer service provider.

Figure 2:
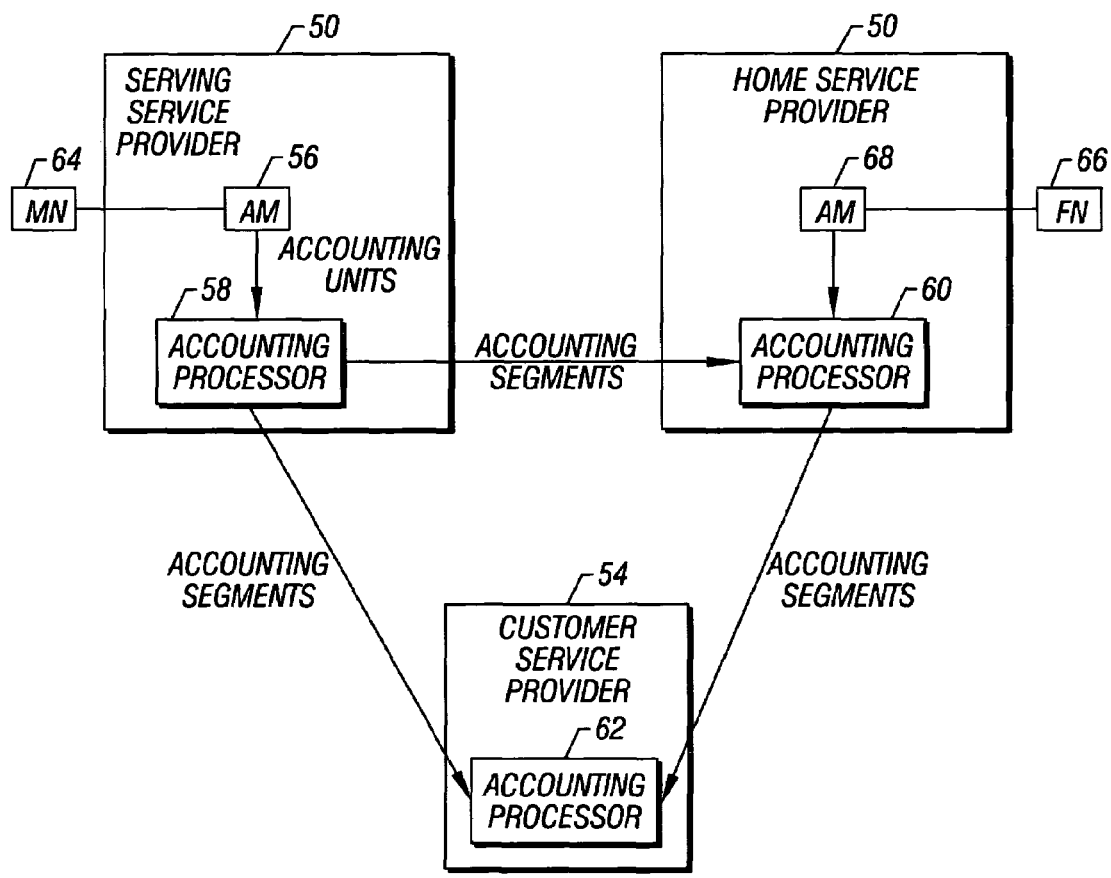
FIG. 2 illustrates entities involved in accounting for services used by subscribers in accordance with an embodiment.

Referring to FIG. 2, three entities are illustrated: a serving service provider 50, a home service provider 52, and a customer service provider 54. Although illustrated as separate entities, the service providers 50, 52 and 54 may be one entity. For example, a mobile node that stays within its home network is served by its home service provider. The home service provider 52 may also be responsible for customer service tasks such as billing and establishment of services (tasks that may be provided by the customer service provider 54). The accounting framework is also available for fixed nodes, such as fixed node 66. When applied to a fixed node, the concept of visiting another network is not applicable. The accounting information of a fixed node is collected by its home service provider, which may be an Internet service provider.

In the illustrated embodiment of FIG. 2, a mobile node may be serviced by the serving service provider 50. Usage of services is monitored by an accounting meter 56, which communicates accounting units to an accounting processor 58 in the serving service provider. The accounting processor 58 packages the accounting units into accounting segments that are sent to an accounting processor 60 in the home service provider 52 and/or to an accounting processor 62 in the customer service provider 54. Such accounting segments may also be packaged as accounting segments and sent from the home service provider 52 to the accounting collector 62 in the customer service provider 54. From information in the accounting collector 62, bills may be generated for subscribers of the customer service provider 54. As used here, an "accounting unit" may refer to the unit of accounting information collected by a monitoring device such as the accounting meter. "Accounting unit" may also refer to any accounting information packaged to be exchanged between entities, such as the accounting segments referred to above.

An accounting meter 68 may also be provided in the home service provider 52 for monitoring usage of mobile nodes in its network and to monitor usage of the fixed node 66. The accounting meter 56 in the serving service provider 50 may also be coupled to fixed nodes. The designation of "serving" and "home" when applied to fixed nodes is not applicable. Fixed nodes are coupled to their subscribed service providers. However, to the extent that a fixed node is accessing a network operated by another service provider, the other service provider may collect accounting information from which the subscriber may be charged. Also, the designation of "serving" and "home" as shown in FIG. 2 may be swapped if another mobile node has the service provider 50 as its home provider and the service provider 52 as its visited or external provider.

Figure 3:
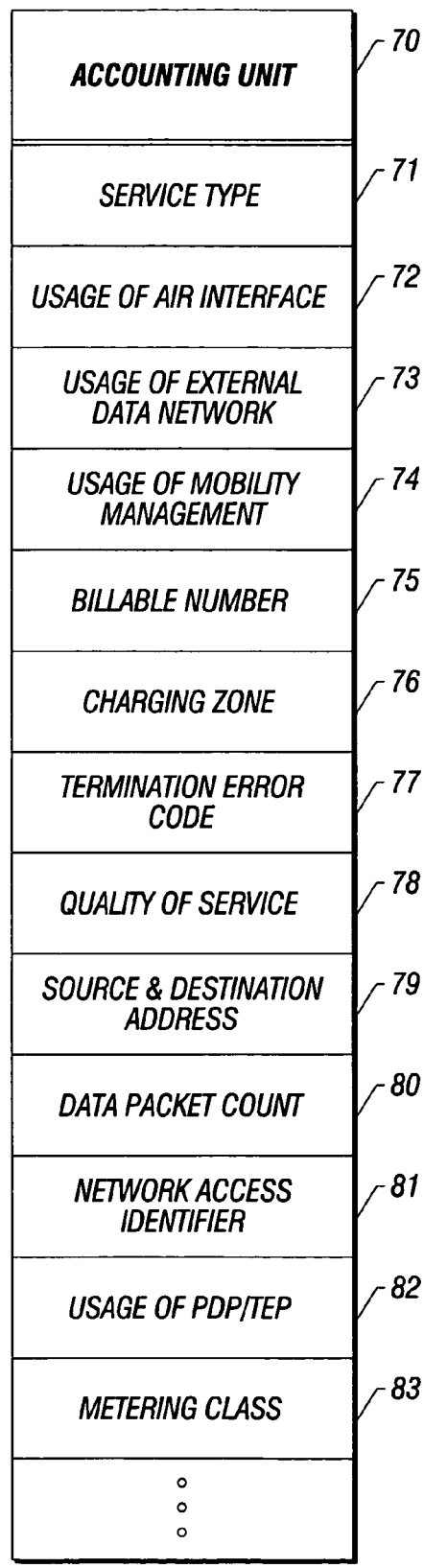
FIG. 3 illustrates an accounting unit according to an embodiment communicated by the entities of FIG. 2.

Referring to FIG. 3, in accordance with some embodiments, each accounting unit 70 generated by the accounting meter 56 or 68 may include a number of fields to monitor usage of wireless networks and the data networks. Such fields are used to account for usage of services in accordance with some embodiments so that subscribers may be billed.

A service type field 71 in each accounting unit 70 indicates the type of service that is provided on the data network 16. Such services may include real-time services (such as multimedia conferencing or messaging), electronic commerce, multicast services, electronic mail services, web browsing, file transfer services, and so forth. The service type field 71 allows a service provider to bill according to service type, since different types of services require different levels of resources. For example, multimedia conferencing may require a relatively high level of resource usage on the data network 16 since relatively large amounts of data are communicated with some level of quality assurance. Accordingly, a service provider may charge more for such services. On the other hand, electronic mail requires relatively low resource usage. The service type field 71 is logged in the accounting unit 70 when a subscriber makes a service request.

Another field in the accounting unit 70 is a usage of air interface field 72, which provides information of radio resource usage by a mobile node. The usage of air interface field 72 describes the amount of data transmitted to and from the mobile node along with quality of service (QoS) information to indicate whether the data sent is delay sensitive or delay tolerant. The usage of air interface field 72 may also supply the user protocols employed, such as IP or X.25. The amount of data that is sent or received to or from the mobile node 64 is logged.

Another field in the accounting unit 70 is a usage of external data network field 73, which provides charging information describing the amount of data sent and received from the visited or external data network provided by the serving service provider 50. The usage of external data network field 72 helps to consolidate the billing issues between two service providers by setting up the billing rate for inter-network roaming by a mobile node. The amount of data that is transferred between a mobile node and a visited or external data network is logged in this field.

Another field is a usage of mobility management field 74, which provides information of mobility management resources. A mobile node can choose to activate or not mobility management. If mobility management is activated, the mobile node can roam between different networks while staying connected to the data network 16. Such a capability is offered by mobile IP, in which a care-of address may be changed as a mobile node changes its points of attachment to the data network 16 when it travels between networks. The mobile node may be in one of three mobility management states: idle, standby, and active. In standby or active state, mobility management is available. However, when the mobile node is in an idle state, mobility management is turned off. When in the idle state, the ability to stay continually connected to a data network as a mobile node changes points of attachment is not available. A subscriber may be charged for mobility management based on the amount of time used, such as by the second.

The accounting unit 70 also includes a billable number field 75. The billable number field 75 may be in the format of a credit card number, an authorization number, a full national number, an IP address, or even a phone number. The field 75 provides the information about how to bill the mobile node. The billable number field 75 may include a type sub-field to identify the type of billable number. The billable number field 75 may be set for each subscriber when service is initially established for a subscriber by a provider, or the field 75 may be dynamically set depending on how a subscriber desires to pay for a given service.

Another field in the accounting unit 70 is a charging zone field 76, which allows for different charging zones to be set up in a logical network. This information allows a service provider to charge a subscriber different rates in different locations, such as by geographic locations or by intranet versus Internet use.

Another field is a termination error code field 77, which records any error that may cause an abnormal service termination. This information helps a service provider to improve service as well as to justify issuing credit to the user if needed. The information is captured when a call is dropped due to any error. For example, international calls may suffer high degradation in quality due to low quality transmission facilities of the called party. Having this field makes it easier for the service provider to issue credit to the users, who may complain about poor quality.

The accounting unit 70 may also include a source and destination address field 79, which describes the source and destination addresses (e.g., IP addresses) of source and destination endpoints. The source and destination addresses help identify the network entity that sends packets to a served mobile or fixed node, and also identifies the destination of packets sent from the served mobile or fixed node. This information is logged while a subscriber sends or receives data.

Another field is the quality of service (QoS) field 78, which indicates the quality of service, such as for voice communications or multimedia conferencing over the data network 16, that was employed for the particular communications session. The higher the QoS, the larger the bandwidth consumed, thus justifying billing the user at a higher rate.

The accounting unit 70 also includes a data packet count field 80, which counts the total number of data units that are exchanged between the mobile node 64 or the fixed node 66 and a service provider. Another field is a network access identifier field 81, which is used to uniquely identify a node in a network (e.g., user@nortel.com). The service provider provides this unique information before service can be rendered to the node. The NAI can remain unique even in a private network setup where an IP address that belongs to the particular enterprise may easily be a duplicate of another public (unique) IP address.

A usage of PDP (Packet Data Protocol) context and tunnel management services field 413 includes charging information describing how long a mobile node has used the packet data protocol (e.g., IP or X.25). Such information provides a service provider the opportunity to charge for the usage of a packet data protocol. While PDP context and tunnel management is active, a mobile node is allowed to send and receive data. When PDP context and tunnel management is not active, a mobile node is not allowed to send or receive data. A mobile node may choose to stay in an active PDP context and tunnel management state even though it is not actively sending or receiving any data. If PDP context and tunnel management is active, a service provider may want to know about the duration of this active state and charge accordingly.

A metering class field 414 indicates metering values such as pay phone, credit card, test call, ordinary, audit purpose, study, and so forth. If chargeable, this information is used to identify the billing rate of the call. This is captured during the registration of a call. Other fields that may be included in the accounting unit 70 are described further below.

The foregoing provides a general description of entities that may be involved as well as accounting units that may be employed in an accounting framework according to some embodiments. Accounting units exchanged between different types of providers (such as cellular service providers and Internet service providers) use common identifiers to keep track of the records. The common identifiers may be based on the identification of the subscriber, such as a mobile identification number (MIN), a network access identifier (NAI), an IMSI, and so forth. The common identifier may also be some other arbitrary identifier from which a service provider may derive (such as from a table) the identity of the node.

A more detailed accounting framework is described below. In one embodiment, the accounting framework employed may be based on, but modified from, the CDPD accounting service and protocol, as described in the CDPD System Specification. It is noted that other frameworks may be used in other embodiments.

Figure 4:
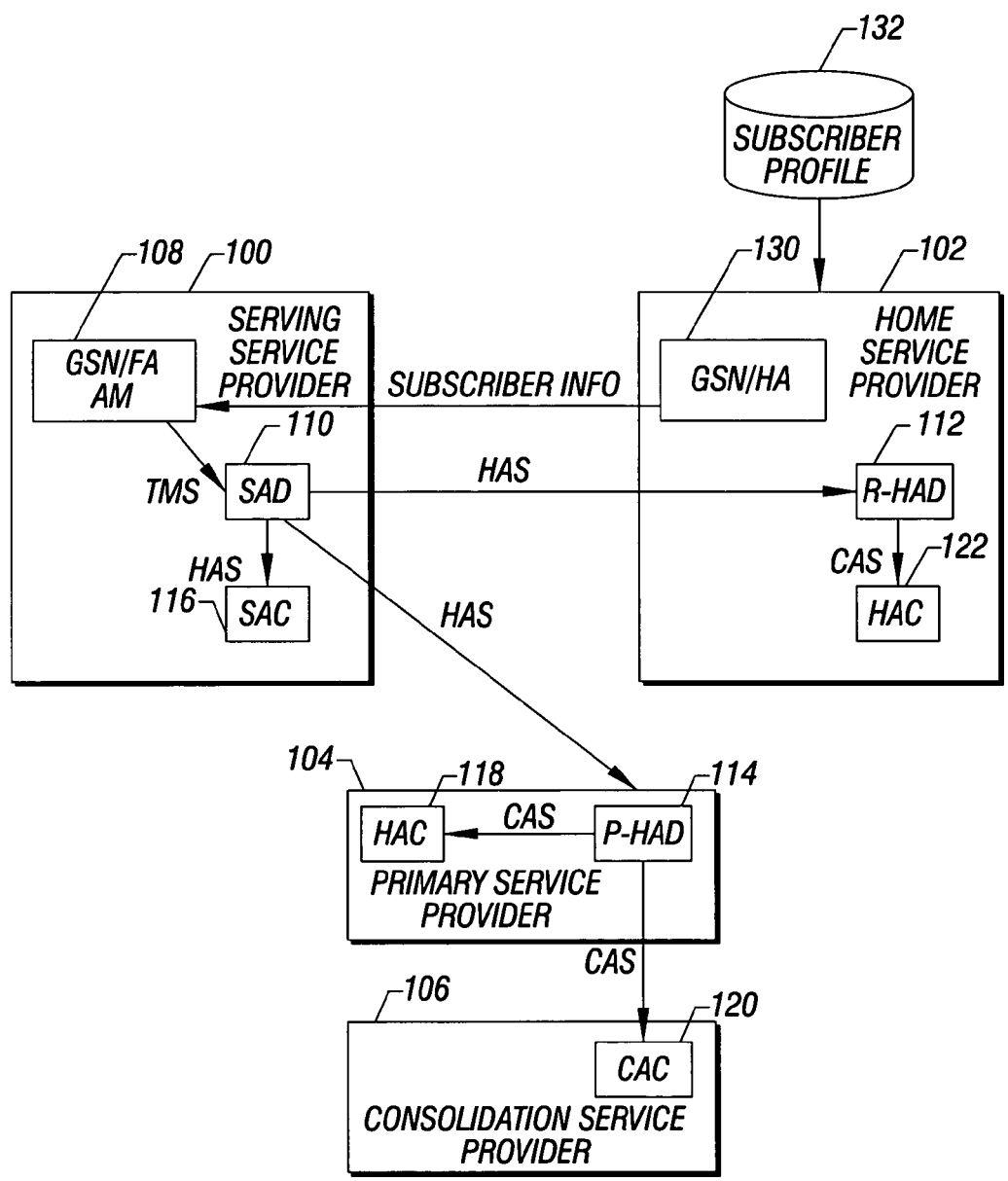
FIG. 4 illustrates accounting components of different service providers in accordance with one embodiment in the communications system of FIG. 1.

Referring to FIG. 4, a serving service provider 100, a home service provider 102, a primary service provider 104, and a consolidation service provider 106 are illustrated. Each of the serving service provider 100 and home service provider 102 may either be a cellular access provider or an Internet service provider. The cellular access provider operates a cellular access network, such as networks 12 and 14 (FIG. 1). A cellular access provider includes at least one GSN and a routing home accounting distributor (R-HAD), which is discussed further below. An Internet service provider operates an Internet service provider network that includes at least a home agent and foreign agent and an R-HAD.

In FIG. 4, it is assumed that a mobile node is being served by the serving service provider 100. The serving service provider 100 includes a module 108 (a GSN or foreign agent) that includes one or more accounting meters (AM). Subscriber information of a visiting mobile node may be forwarded by a module 130 (a GSN or home agent) in the home service provider 102 to the serving service provider. The home service provider 102 maintains a subscriber profile database 132.

The accounting meters generate accounting units, referred to as traffic matrix segments (TMS), that contain captured accounting information based on usage in response to various communication events, such as registration and deregistration and usage of various services. For a mobile node, the accounting meters may be part of the GSN of a cellular service provider or the home agent or foreign agent of an Internet service provider.

The accounting meters deliver traffic matrix segments to a serving accounting distributor (SAD) 110. The SAD 110 sorts the traffic matrix segments into different home accounting segments (HAS) based on the primary and routing homes of each subscriber. The home accounting segments are delivered to an R-HAD 112 in the home service provider 102 and to a P-HAD (primary HAD) 114 in the primary service provider 104. The SAD 110 also delivers home accounting segments (HAS) to a serving accounting collector (SAC) 116 located in the serving service provider 100. The home accounting segments contain subsets of the information in the traffic matrix segments. The serving accounting collector 116 receives all home accounting segments distributed by multiple SADs 110 of the serving service provider 100, and thus stores all accounting data pertaining to service provided the serving service provider 100 in its serving role. The serving accounting collector 116 stores such information to maintain an audit trail.

Each of the R-HAD 112 and P-HAD 114 receives home accounting segments from multiple SADs 110 of different service providers and consolidates them into consolidation accounting segments (CAS). Consolidation accounting segments contain subsets of information in the home accounting segments. The primary HAD 114 delivers the consolidated accounting segments to a home accounting collector (HAC) 118 in the primary service provider 104. The primary HAD 114 also delivers consolidated accounting segments to a consolidation accounting collector (CAC) 120 in the consolidation service provider 106. The routing HAD 112 delivers consolidated accounting segments to a home accounting collector 122 in the home service provider 102.

The home accounting collectors 118 and 122 receive consolidation accounting segments from their respective HADs. The consolidation accounting segments received by each home accounting collector are stored, analyzed, and processed for each mobile node or fixed node in the system. From the collected information, subscribers and customers may be billed based on usage of services on the data network 16 and wireless usage (for mobile nodes). The information collected in the consolidation accounting collector 120 allows consolidation of accounting information collected for several subscribers that may belong to the same accounting group.

The traffic matrix segments, home accounting segments, and consolidation accounting segments may all be referred to as "accounting units" since they have predefined formats for carrying accounting information. The accounting units may be conveniently exchanged between entities involved in the accounting process. Using the accounting units in accordance with some embodiments, translation or conversion between formats is not needed when accounting information is exchanged, making the accounting procedure less complicated than a system in which entities such as service providers may define their own proprietary formats.

Figure 5:
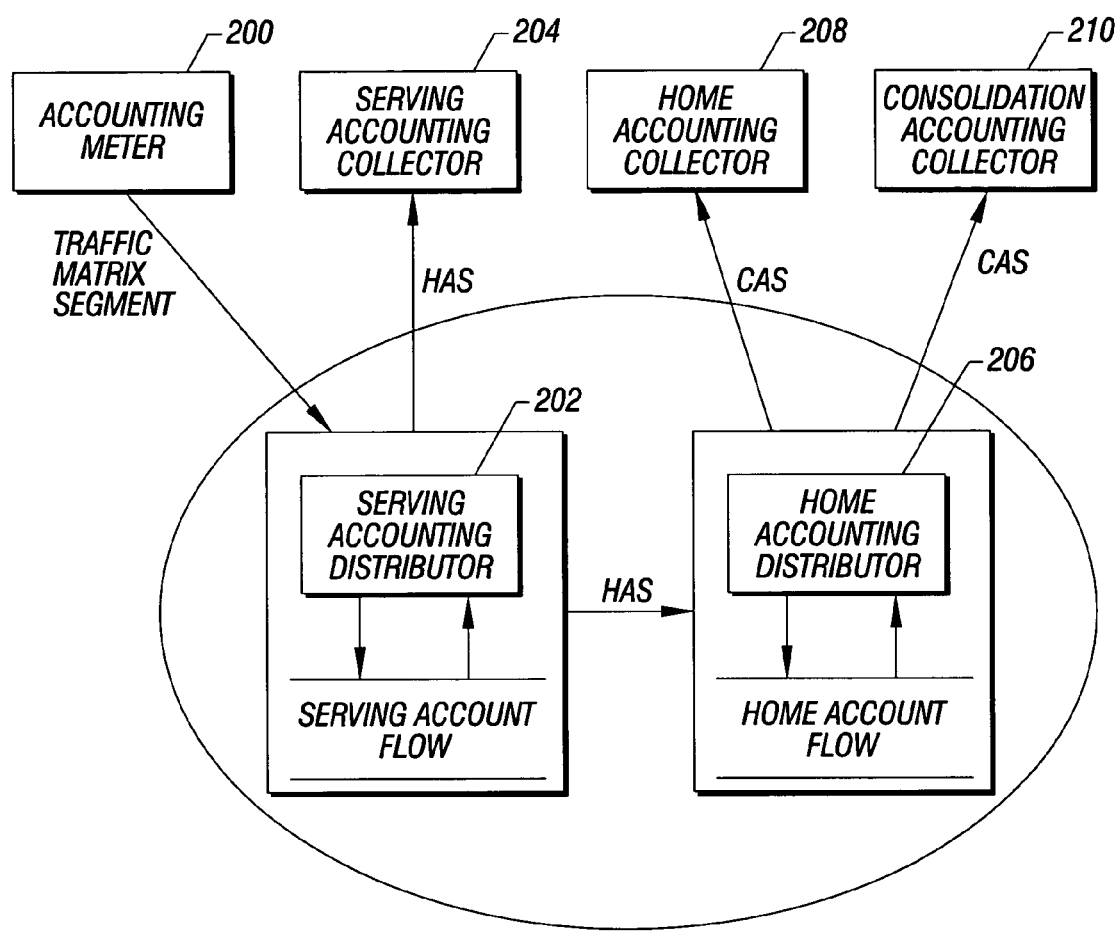
FIG. 5 illustrates an accounting architecture in accordance with one embodiment provided by the accounting components of FIG. 4.

The flow of accounting information is illustrated further in FIG. 5. Although illustrated as being separate entities in FIG. 4, the serving service provider 100, the home service provider 102, the primary service provider 104, and the consolidation service provider 106 may be part of the same entity in some embodiments. For example, a mobile node may stay within its home service provider network, in which its home service provider may also be its primary service provider. Thus, the home service provider in this scenario is also a serving service provider.

Thus, as illustrated in FIG. 5, an accounting meter 200 in the service provider serving a mobile node collects statistical information to provide one or more traffic matrix segments that are forwarded to an SAD 202. The GSN of a cellular service provider is responsible for collecting charging information relating to the cellular (e.g., GPRS) networks and radio usage as well as external network usage. The home agent or foreign agent of an Internet service provider is responsible for collecting charging information relating to the Internet service provider and external network usage. For fixed nodes, Internet service providers may also collect charging information for usage of services over the data network 16. The SAD 202 converts each traffic matrix segment into home accounting segments and delivers the home accounting segments to a serving accounting collector 204 and to a home accounting distributor 206. The SAD 202 can combine traffic matrix segments from multiple accounting meters into a home accounting segment, or it can split a traffic matrix segment for delivering in different home accounting segments.

The HAD 206 encapsulates received home accounting segments into consolidation accounting segments that are sent to a home accounting collector 208 and/or to a consolidation accounting collector 210.

Figure 6:
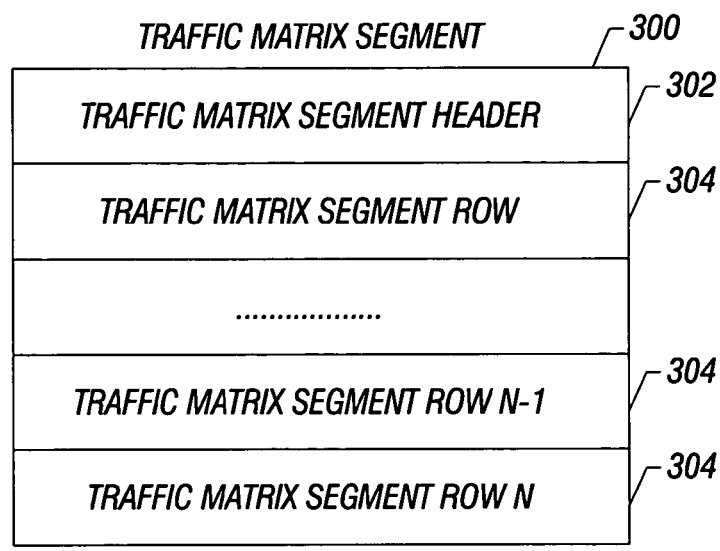
FIG. 6 illustrates a traffic matrix segment that forms a unit of accounting information in accordance with one embodiment.
Figure 7:
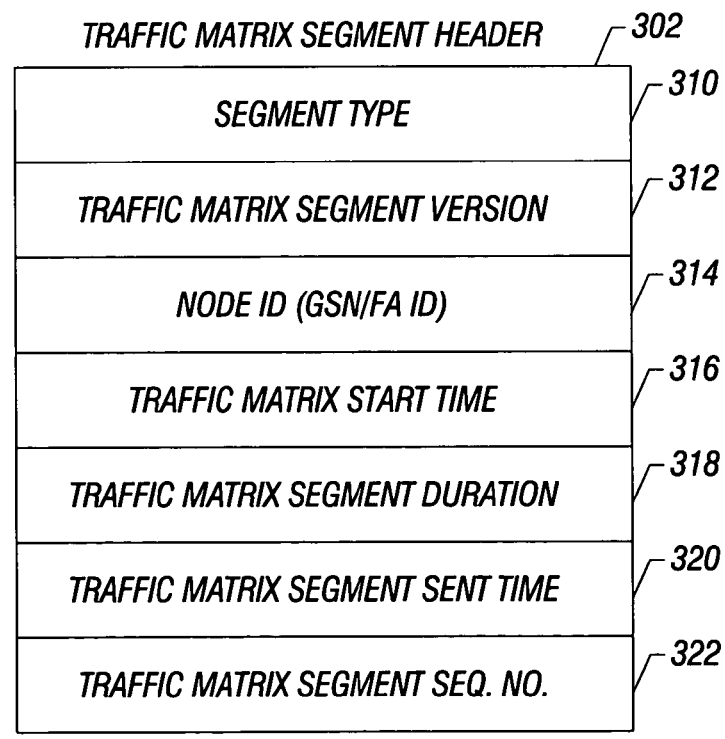
FIG. 7 illustrates the elements of a header in the traffic matrix segment of FIG. 6.

Referring to FIGS. 6–8, in accordance with one embodiment, a basic accounting unit 70 can include a traffic matrix segment 300. However, as noted above, the information in the traffic matrix segment may be repackaged into other accounting units, such as the home accounting segments and consolidation accounting segments. The traffic matrix segment 300 may include a header portion 302 and a plurality of row entries 304. Each row entry 304 may be thought of as a record of a session between two network entities over some period of time (referred to as an accounting meter duration). The header 302 captures information common to all row entries 304, including the start time and actual duration.

As illustrated in FIG. 7, the traffic matrix segment header 302 includes several fields, including a segment type field to distinguish a traffic matrix segment from a home accounting segment or a consolidation accounting segment. A version field 312 indicates the version of the traffic matrix segment format. A node ID field 314, contains mobile and packet data protocol context/care-of address of the specific GSN or foreign agent that generated the traffic matrix segment. The node identifier serves as an identifier for the accounting meter. A start time field 316 identifies the data and time of day that the traffic matrix segment was instantiated. A duration field 318 provides the amount of time between the instantiation of the traffic matrix segment and the time a reporting trigger is fired, which may be at least once every hour. A sent time field 320 indicates the date and time of day that the traffic matrix segment was sent to an SAD. A sequence number field 322 is a number that is incremented each time a new traffic matrix segment is sent to an SAD.

The fields of each traffic matrix segment row are illustrated in FIG. 8. Some of the fields of the traffic matrix segment have already been described in connection with FIG. 3, including fields 71–82. The other fields of each traffic matrix segment row 304 are described below. Although a number of fields are defined, how those fields are employed by service providers to account for services and bill subscribers is dependent on the individual service provider. For example, depending on policies and service agreements in place with subscribers, a service provider may choose to charge or not charge for certain types of services, such as electronic mail, web browsing, and so forth. Also, some service providers may choose to ignore some of the fields listed below, using only a subset of the fields available in a traffic matrix segment.

A cell identifier field 400 in the traffic matrix segment row 304 contains information about the cell that provided service for transfer of packets or datagrams between a mobile node and a cellular node, such as a GSN or a foreign agent in either the forward or reverse direction. The cell identifier field 400 identifies the cell being used by the mobile node at the time the row 304 was created in the traffic matrix segment 300.

A traffic type field 401 indicates the type of packets or datagrams that is being measured. The serving information field 402 includes information that is used for settlement between service providers. The serving information field 402 may include the following values. An SPI (service provider identifier) identifies the business entity that will participate in settlement activities with the primary service provider. A serving BRI (business relationship identifier) value uniquely identifies a business relationship for service providers and is used for revenue sharing upon settlement between service providers. Other information may also be included in the serving information field 402.

A home information field 403 includes the following information. A service provider identifier of a primary service provider (primary SPI) and home accounting distributor identifier of a primary service provider (P-HAD-ID) are associated with a mobile node's care-of address. A routing SPI (service provider identifier of the home service provider) and a routing HAD identifier (R-HAD-ID) are also associated with a mobile node's care-of address. If the accounting home and routing home for a care-of address are the same (indicating that the primary and home service providers for the mobile node are the same), then the routing SPI and R-HAD-ID fields are set to zeros.

The contents of the home information field 403 may be retrieved by a GSN or home agent from the subscriber profile 132 (FIG. 4) or by some other mechanism. The SPI and HAD-ID values noted above (both primary and routing) are used by an SAD to determine where to send a home accounting segment, as discussed in connection with FIGS. 4 and 5.

An equipment identifier field 404 is an identifier transmitted from a mobile node to a cellular node, such as a foreign agent or GSN, in an identity request message. This identifies the equipment type of the mobile node. An authentication sequence number field 405 includes an authentication sequence number that is captured by a cellular node (such as a GSN or foreign agent), during a mobile network registration sequence. A source-destination flag 406 determines which direction a packet is flowing (to or from the mobile node). An MIN field 407 is an identifier of the network layer that is running at the subscriber's node on the mobile side.

A session ID field 408 is a unique identifier for a session. A session duration field 409 measures the duration of a session from call origination to termination. A sub-usage duration field 410 is the duration of a session between two care-of addresses. In other words, the sub-usage duration field 410 indicates the amount of time elapsed between changing of care-of addresses in response to a mobile node changing points of attachment.

A charging identifier field 411 is a PDP context identifier used to identify the PDP context in different records created by cellular nodes, such as GSNs. A PDP type field 412 indicates a PDP type, such as X.25 or IP.

As explained above, the data packet count field 80 is a count of the total number of data packets (non-control packets) sent in the direction indicated by the source/destination flag 406 for the duration of the traffic matrix segment. A data octet count field 415 may also be provided to count the total number of octets of non-control packets sent in the direction indicated by the source/destination flag 406. A control packet count field 416 may also be provided that is a count of the total number of control packets sent in the direction indicated by the source/destination flag. A control octet count field 418 includes the count of total number of octets in control packets sent in the direction indicated by the source/destination flag.

A discarded packet count field 419 indicates the number of data packets that were sent in the forward direction to a mobile IP address and that have to be discarded by the network. Forward channel packets may be discarded if the mobile node moved to a new cellular node (e.g., GSN or foreign agent) but the GSN/home agent has not yet been updated with this fact.

The information compiled into the traffic matrix segments by accounting meters are used by service providers to bill subscribers according to their usage of services. Each service provider may choose to charge differently based on the accounting information provided in the traffic matrix segments. However, embodiments of the invention provide a common accounting unit that may be used by multiple service providers to bill their subscribers. Advantages offered by some embodiments are that service providers do not need to rely upon proprietary accounting mechanisms to bill for services. By using a common accounting unit that is understandable by all service providers, uniformity in the way accounting information is collected by service providers is enhanced, thereby simplifying the cooperation of service providers in collecting information to bill subscribers. For example, if exchange of accounting information is needed, translations or conversions between different formats can be avoided by using the common format.

Figure 9:
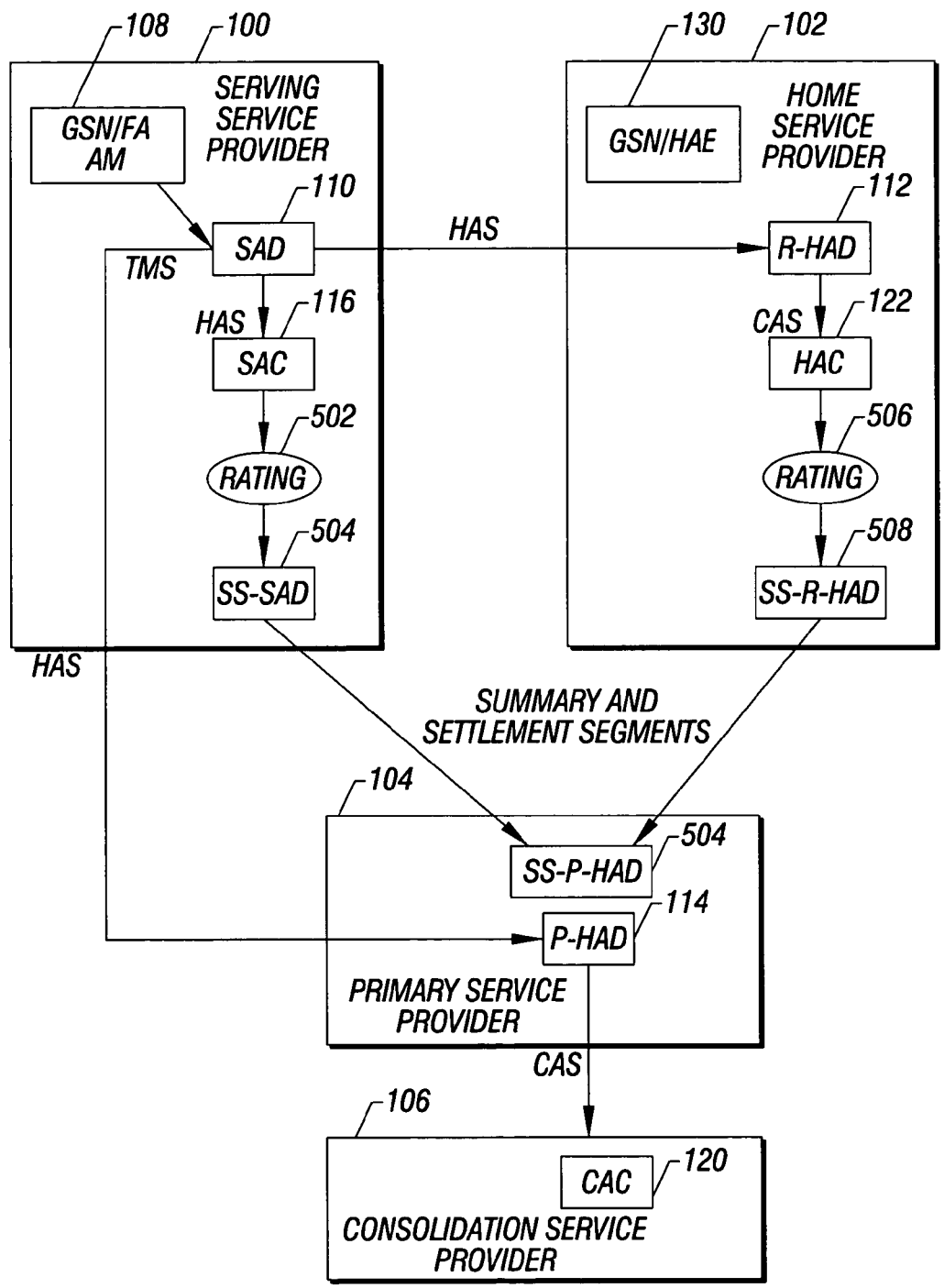
FIG. 9 illustrates an accounting summary and settlement flow in accordance with one embodiment between the service providers of FIG. 4.

Referring to FIG. 9, the service providers may also perform procedures for exchange of summary and settlement information to support subscriber billing and inter-service provider reconciliation. The serving and home service providers may periodically send a summary segment to all primary service providers with which they have a business agreement. This is done to ensure that both parties have the same information regarding services that have been used by subscribers. This supports subscriber billing by a primary service providers and enables settlement between service providers.

A summary segment sent by the serving service provider 100 to a primary service provider 104 contains usage charges (including taxes) that the serving service provider 100 calculates as its expected payment for the usage incurred by visiting subscribers. The charges for this usage is based on home accounting segments collected by the serving accounting collector 116 for subscribers of the primary service provider 104. The summary segment from the home service provider 102 to the primary service provider 104 contains charges (including taxes) that the home service provider 102 calculates as its expected payment for forwarding services for visiting subscribers, based on the summary of usage of services for each subscriber.

The serving and home service providers 100 and 102 also send settlement segments to the primary service provider 104 on a periodic basis to enable the invoicing and payment process. Settlement segments contain total charges due from a primary service provider over the settlement period.

The serving accounting collector 116 sends home accounting segments to a rating and taxing entity 502 that passes the usage and rating information to a summary and settlement serving accounting distributor (SS-SAD) 504. Similarly, the home accounting collector 122 sends consolidation account segments to a rating and taxing entity 506 that forwards the usage and rating information to a summary and settlement routing home accounting distributor (SS-R-HAD) 508. The rating and taxing entities 502 and 506 calculate charges and taxes based on national, state, and local regulations and inter-service provider agreements. The SS-SAD 504 and SS-R-HAD 508 send summary and settlement segments to the summary and settlement home accounting distributor (SS-P-HAD) 510 in the primary service provider 104.

Figure 10:
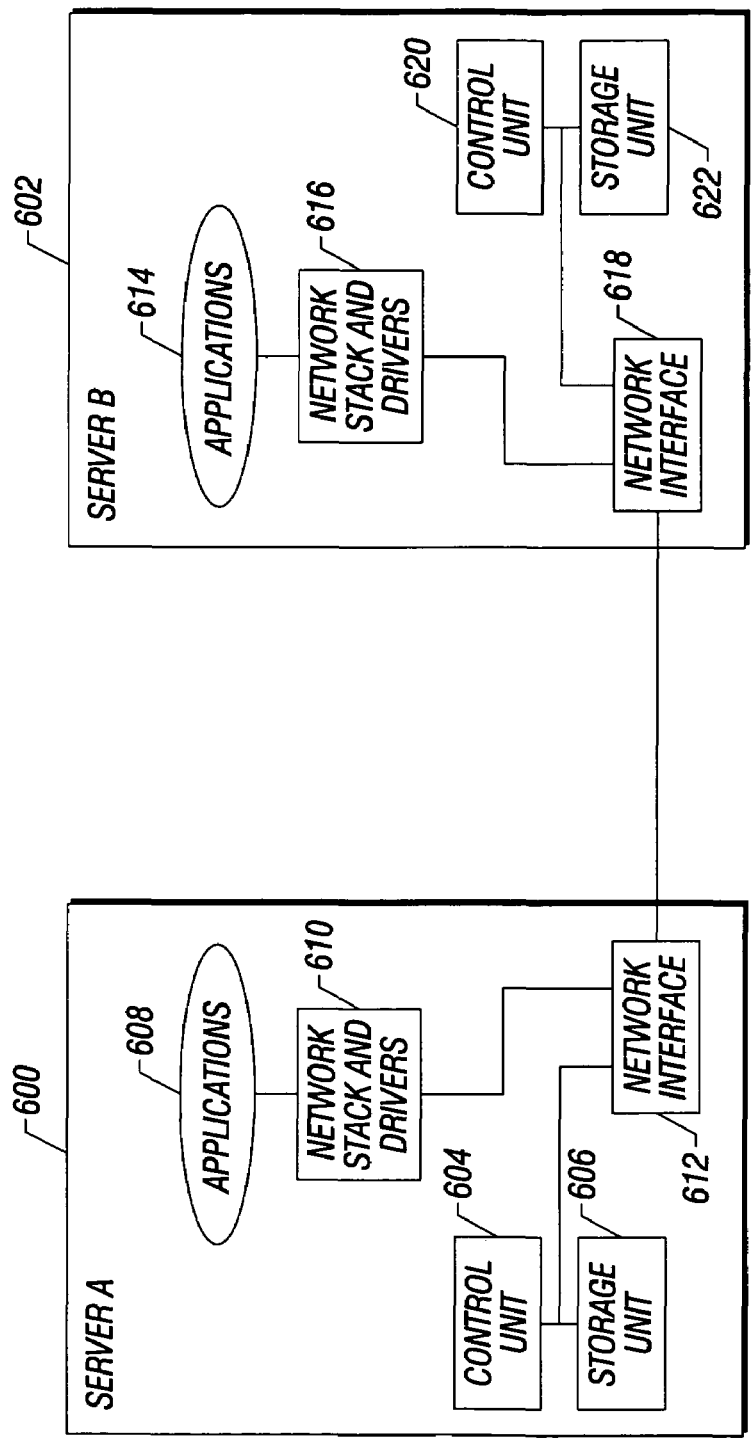
FIG. 10 is a block diagram of components in example servers associated with service providers.

Referring to FIG. 10, example components of servers or systems 600 and 602 corresponding to different service providers are illustrated. Each server or system 600 or 602 may include a GSN, an HA, an FA, or any other system involved in performing accounting in accordance with some embodiments. Each server 600 and 602 includes software application routines 608 and 614, respectively. The application routines include the various accounting components described above, such as an accounting meter, an HAD, an SAC, an HAC, a CAC, or any other software routine or module involved in performing accounting in accordance with some embodiments. Multiple servers or systems may be associated with each service provider. For example, a cellular service provider may have a server for providing circuit-switched wireless services (e.g., the MSC) and another server for providing packet-based wireless services (e.g., the GSN).

The applications may communicate over a network (such as the network 16) through network stack and driver layers (610 and 616) and network interfaces (612 and 618). The network stack 610 or 616 may include a TCP/IP (Transmission Control Protocol/Internet Protocol) stack. The network interface 612 or 618 may include a network controller. The software routines and modules in each server or system 600 or 602, such as applications 608 or 614, may be executable on a respective control unit 604 or 620. A storage unit 606 or 622 is also included in each server or system to store data (e.g., accounting data) and instructions (e.g., instructions of the routines and modules for performing accounting tasks).

Each control unit 604 or 620 may include any one of the following components: microprocessors, microcontrollers, processor cards (including one or more microprocessors or microcontrollers), and other control or computing devices. Each storage unit 606 or 622 may include machine-readable storage media for storing data and instructions. The storage media may include different forms of memory including semiconductor memory devices such as dynamic or static random access memories (DRAMs or SRAMs), erasable and programmable read-only memories (EPROMs), electrically erasable and programmable read-only memories (EEPROMs), and flash memories; magnetic disks such as fixed, floppy and removable disks; other magnetic media including tape; and optical media such as compact discs (CDs) or digital video discs (DVDs). Instructions that make up the various software layers in each of the servers or systems may be stored in each respective storage unit. The instructions when executed by a respective control unit cause the server or system to perform programmed acts.

The instructions of the software routines or modules may be loaded or transported into a system or device in one of many different ways. For example, code segments or instructions stored on floppy disks, CD or DVD media, the hard disk, or transported through a network interface card, modem, or other interface mechanism may be loaded into the system or device and executed as corresponding software routines or modules. In the loading or transport process, data signals that are embodied as carrier waves (transmitted over telephone lines, network lines, wireless links, cables, and the like) may communicate the code segments or instructions to the system or device. Such carrier waves may be in the form of electrical, optical, acoustical, electromagnetic, or other types of signals.

While the invention has been disclosed with respect to a limited number of embodiments, those skilled in the art will appreciate numerous modifications and variations therefrom. It is intended that the appended claims cover all such modifications and variations as fall within the true spirit and scope of the invention.

What is claimed is:

1. A method of accounting for services provided over a packet-based network, comprising:
   determining a type of service used over the network;
   monitoring usage of the service; and
   collecting accounting information based on the type of service and usage of the service, wherein collecting the accounting information includes compiling the accounting information into an accounting unit,
   wherein the accounting unit has a first entry to indicate a quality of service provided over the packet-based network, and a second entry to indicate mobility management.

2. The method of claim 1, wherein the determining, monitoring, and collecting are performed in a first entity, the method further comprising transmitting, from the first entity, the accounting unit to at least another entity.

3. The method of claim 2, further comprising assigning an identifier with the collected accounting information that is common between the first entity and the at least one other entity.

4. The method of claim 1, further comprising using an accounting unit having a common format for convenient exchange between entities.

5. The method of claim 1, further comprising using an accounting unit including a traffic matrix segment.

6. The method of claim 1, wherein determining the type of service includes determining one of a plurality of service types, wherein collecting the accounting information comprises collecting an additional entry assigned a value to indicate a type of service.

7. The method of claim 6, wherein determining one of the plurality of service types include determining one of real-time communications and at least another type of service.

8. A method of accounting for services provided over a packet-based network, comprising:
   communicating a unit of accounting information carrying information regarding usage of the packet-based network by a terminal, the unit of accounting information having a predetermined format capable of being exchanged between a plurality of entities; and
   assigning values to entries in the unit of accounting information based on usage, the unit including a first entry indicating a quality of service provided over the packet-based network and a second entry containing a network access identifier of the terminal to uniquely identify the terminal.

9. The method of claim 8, wherein assigning values to entries further includes assigning a value to an additional entry indicating a type of service.

10. The method of claim 9, wherein assigning values to entries further includes assigning values to additional entries including entries indicating usage of a radio interface, indicating usage of a visited network, indicating usage of mobility management, and indicating an amount of data transferred.

11. The method of claim 10, wherein assigning values to entries further includes assigning a value to an additional entry indicating erroneous termination of communications.

12. A method of accounting for services provided over a packet-based network, comprising:
   communicating a unit of accounting information carrying information regarding usage of the packet-based network by a terminal, the unit of accounting information having a predetermined format capable of being exchanged between a plurality of entities; and
   assigning values to entries in the unit of accounting information based on usage, the unit including a first entry indicating a quality of service provided over the packet-based network and a second entry containing a network access identifier of the terminal to uniquely identify the terminal,
   wherein assigning values to entries further includes assigning a value to an additional entry indicating a type of service,
   wherein assigning values to entries further includes assigning values to additional entries including entries indicating usage of a radio interface, indicating usage of a visited network, indicating usage of mobility management, and indicating an amount of data transferred,
   wherein assigning values to entries further includes assigning a value to an additional entry indicating erroneous termination of communications,
   wherein assigning values to entries further includes assigning a value to an additional entry indicating an amount of discarded data.

13. A system capable of being coupled to a packet-based network, comprising:
   a controller to collect usage information based on a service used by a node on the packet-based network; and
   a storage device containing an accounting unit in which the usage information is collected, the accounting unit including a plurality of entries to identify usage elements from which accounting may be derived, the entries comprising a first entry to indicate a quality of service used by the node and a second entry to indicate usage of mobility management.

14. The system of claim 13, wherein the entries of the accounting unit include an entry identifying a type of service used.

15. The system of claim 13, wherein the entries of the accounting unit further comprise entries indicating elements used by a mobile node, including mobility management, usage of a radio interface, and usage of a visited network.

16. The system of claim 13, wherein the accounting unit includes a traffic matrix segment.

17. The system of claim 13, wherein the accounting unit is according to a predetermined format, the controller to further communicate the accounting unit to another entity.

18. The system of claim 13, further comprising:
   an accounting processor adapted to receive accounting units from at least one other entity.

19. The system of claim 18, wherein the accounting processor is adapted to generate billing to a subscriber based on one or more of the accounting units.

20. An article including one or more machine-readable storage media containing instructions for accounting for services used on a packet-based data network, the instructions when executed causing a system to:
- determine usage elements associated with each service, the usage elements including a service type, amount of data communicated, and mobility management; and
- collect accounting units each including entries identifying the usage elements.

21. The article of claim 20, wherein the one or more storage media contain instructions that when executed cause the system to further communicate the accounting units to another entity.

22. A computer data signal embodied in a carrier wave comprising one or more code segments containing instructions for accounting for services used on a packet-based data network, the instructions when executed causing a system to:
- receive accounting units from at least another entity, each accounting unit containing a first entry identifying a quality of service, a second entry identifying a terminal the accounting unit is associated with, and a third entry indicating usage of mobility management;
- determine, from each accounting unit, usage of a service on the packet-based network; and
- charge at least a subscriber for the usage of the service.

23. A storage device for storing data for access by one or more software routines being executed on a system, comprising:
- a data structure stored in the storage device and including a plurality of entries, the entries including a first field indicating a quality of service provided over a packet-based network, a second field indicating if the service is chargeable, and a third field including an identifier identifying a node using the service.

24. The storage device of claim 23, wherein the data structure further includes a field indicating if mobility management is provided for the node, a field indicating usage of a radio interface by the node, and a field indicating usage of a visited network by the node.

25. The method of claim 9, wherein assigning a value to the additional entry comprises assigning one of plural values corresponding to plural types of service.

26. The method of claim 25, wherein the plural types of service comprise real-time communications and at least another type of service.

27. The method of claim 8, wherein communicating the unit of accounting information comprises communicating a traffic matrix segment having a header and plural rows, each row containing accounting information associated with a session having a given time duration.

28. The method of claim 8, wherein assigning values to entries further includes assigning values to additional entries containing source and destination network addresses.

29. The method of claim 8, further comprising monitoring usage of services on the packet-based network with an accounting meter, wherein assigning values to the entries is performed by the accounting meter.

30. The article of claim 20, wherein the usage elements further comprise quality of service, usage of air interface, and a network access identifier.

* * * * *